Figure 1:
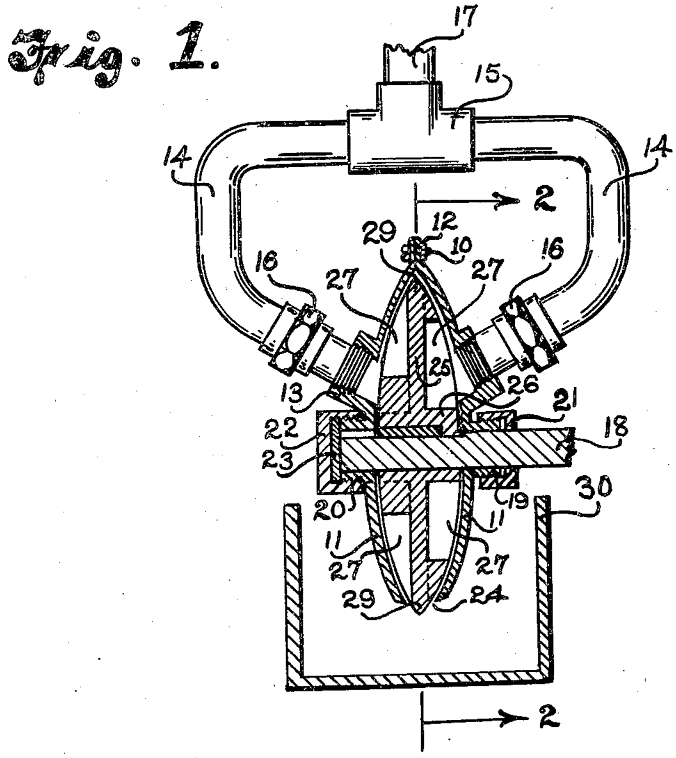

June 23, 1942. H. H. SCHMIDT 2,287,067

METHOD OF MECHANICALLY CHANGING CHARACTERISTICS OF LIQUIDS

Filed March 17, 1938

INVENTOR
HERMANN H. SCHMIDT
BY Alfred R. Fuchs
ATTORNEY

Patented June 23, 1942 2,287,067

UNITED STATES PATENT OFFICE 2,287,067

METHOD OF MECHANICALLY CHANGING CHARACTERISTICS OF LIQUIDS

Hermann H. Schmidt, Hanover, Kans., assignor to The Universal Royalty and Development Company, St. Joseph, Mo., a corporation of Missouri Application March 17, 1938, Serial No. 196,524

10 Claims. (Cl. 299—63)

My invention relates to a method of mechanically changing the characteristics of liquids and after the characteristics thereof have been changed, spraying the same on other materials, or impregnating such other materials therewith.

I have found that the characteristics of liquids can be changed by causing the same to be engaged with means for impelling the same rotatively by a rotative whipping or beating action, to violently whip the same about in a confined space, the rotative impelling causing a whirling of the liquid about the center of rotation at such a rate that the same is thrown outward by centrifugal force, and if such rotative impelling, or whipping of the liquid takes place in a confined space, such as in a chamber, the bombardment of said liquid against the walls of the chamber causes such disintegration and breaking down of the same that the characteristics of the liquid are changed and the liquid is finely divided by the action of such centrifugal force thereon. This centrifugal whipping or positive rotative impelling of the liquid should not be confused with mere rotation of a mass of liquid at a high rate of speed, such as takes place in centrifugal machines or centrifugal separators, nor with mere spraying of a liquid by being thrown off by rotative means.

In the practice of my invention the liquid is not rotated as a mass, but is rotatively impelled to be caused to be thrown or whipped about and acted on by centrifugal force as it is fed into the impelling means that creates the centrifugal motion, and is almost instantaneously finely divided. An apparatus suitable for creating such a whipping action or rotative impelling of a liquid in a chamber is shown in my co-pending application Serial No. 116,923, filed December 21, 1936, U. S. Patent 2,241,425, for Apparatus for vaporizing and spraying thick liquids. In the apparatus disclosed in said co-pending application the liquid is impelled rotatively and whipped about so that it is driven outwardly relative to the axis of rotation of the impelling means to bombard or violently engage with the inner surface of the peripheral wall of the confining means, or chamber. This action takes place on opposite sides of a rotating divisional wall or partition in said chamber, so arranged as to cause the liquid on one side of the partition, when thrown outwardly by centrifugal force, to also be thrown in a transverse or axial direction and into engagement with liquid similarly acted on by centrifugal force and thrown outwardly on the opposite side of the partition, the partition terminating short of the chamber wall so that said liquid moving violently outwardly by the action of centrifugal force is engaged with other of such liquid, similarly thrown violently outwardly thereby. It will be noted that, in the apparatus shown in my co-pending application above referred to, the chamber within which the rotor is located, while confining the material acted upon by the rotor is open to the atmosphere, and that the whipping action taking place therein thus takes place within a chamber open to the atmosphere.

While such apparatus as above referred to and as shown in my said co-pending application is preferred for carrying out the method forming the subject matter hereof, other means may be devised that will positively rotatively impel a liquid within a chamber as it is fed into the same to cause the same to be thrown outwardly from the center of rotation by centrifugal force in a violent manner to bombard, or violently engage, the walls of the chamber in which such rotative movement takes place, to cause the material to be changed in its characteristics and broken down and disintegrated due to the violent rotative or centrifugal whirling action or rotative whipping action exerted thereon. In the preferred form of the method the whirling is accomplished in a chamber having inlet and outlet openings so proportioned and arranged that no appreciable compression of the contents of the chamber will take place during the whipping action under the influence of the rotative means.

Under certain conditions the whipping or whirling action by the rotative impelling means within the chamber, or within a confined space, permanently changes the characteristics of liquids. Under other circumstances, the characteristics of the liquids are changed in a similar manner to that accomplished when the conditions are such as to produce a permanent change in the characteristics, but eventually the liquid will return to substantially its original state. Thus where a viscous sticky liquid of dark color is whirled or whipped about in a chamber under the action of rotative impelling means, and the chamber is provided with a substantially unrestricted opening therein, through which air may enter and through which the liquid after having been acted on by the impelling means, is discharged, the change in the material is a permanent one, the same becoming lighter in color and losing its stickiness and at the same time becoming much less viscous and remaining so. Under such conditions there is no compression whatsoever created in the chamber by the action of the rotative impelling means in whipping the material within the chamber about, and a large quantity of air is present during such whipping action.

It has been found, however, that, if the discharge opening of the chamber is connected with a container into which the liquid is discharged without being freely open to the atmosphere, under which circumstances some compression may exist in the chamber under certain conditions of feed, and under which conditions there is no large volume of air present, as in the chamber during the whipping or whirling action above referred to, the liquid will be changed to a lighter color and will lose its stickiness and will decrease in viscosity in a similar manner to that referred to above, but the change will not be permanent. It will exist for a limited period of time so that, if a liquid so treated is applied to another material, it can be applied in the same manner as the liquid that has been permanently changed in its characteristics. However, it will not, if collected in a vessel, retain its changed characteristics indefinitely. After several hours in some cases, or after several days in others, the material will change back to substantially its original condition, losing its lightness of color and becoming more viscous and sticky as it stands. While it is, of course, difficult to determine exactly what takes place under these various conditions, yet it is apparent from experiments that have been conducted by me, that permanency of the change in the liquid is dependent upon the rate of feed and the freedom with which the liquid is capable of discharge from the chamber, as well as the freedom with which air can enter the chamber during such whipping or whirling motion, and the particular liquid treated.

Other objects and advantages of my invention will appear as the description thereof proceeds. I desire to have it understood, however, that I do not intend to limit myself to the particular details described, except as defined in the claims.

Figure 2:
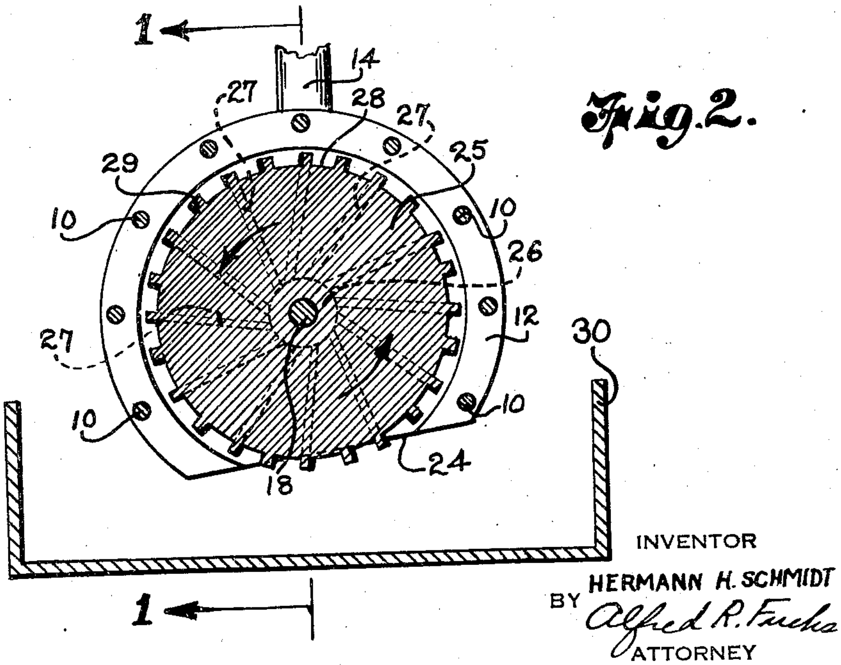

In the drawing:

Fig. 1 is a view partly in vertical section and partly in elevation of one form of apparatus that may be used for carrying out my method, portions thereof being broken away, the section being taken substantially on the line 1—1 of Fig. 2, and Fig. 2 is a view taken substantially on the line 2—2 of Fig. 1.

Referring in detail to the drawing, my apparatus comprises a casing, preferably, made up of a pair of casing portions 11, which are provided with flanges 12, through which the securing elements 10 extend to secure the halves of the casing together in fluidtight relationship. Each casing portion 11 is provided with an inlet passage 13 to which the inlet conduits 14 are connected, said inlet conduits being branches of a piping system extending from a T 15, the conduits 14 being connected with the inlet connections 13 by any suitable connecting means, such as the unions 16, the T being connected with an inlet conduit 17 leading from any suitable source of supply for the liquid or other material that is to be acted on by the apparatus. The shaft 18 is driven in any desired manner, by any desired driving means, and is mounted in suitable bearings 19 and 20, which are provided on the casing portions. A suitable packing nut 21 is provided on the bearing member 19 and suitable packing means can, of course, be provided, if necessary, between the packing nut and the threaded bearing member. The bearing portion 20 has a threaded cap member 22 connected therewith and a packing 23 between said cap member and said bearing to provide a fluidtight joint. The lower part of the casing is cut away as shown at 24 to provide a discharge opening of large capacity at the bottom of the same, the cut away portion being shown as being inclined, as will be clear from Fig. 2, said cut away portion providing for free access of air into the casing, said casing being thus freely open to the atmosphere.

Mounted within the casing and keyed to the shaft 18 is an impeller member, or rotor, which, preferably, rotates in the direction indicated by the arrows in Fig. 2, and which comprises a disk-like central web portion 25 extending from the hub portion 26, which is keyed to the shaft outwardly toward the inner periphery of the casing 11, but spaced therefrom a slight distance, as will be evident from Fig. 2. It will be noted that the casing portions 11 are curved inwardly toward each other, so as to form a gradually narrowing chamber from the axis of rotation of the shaft 18 outwardly to the annular peripheral edge thereof at the flanges 12, thus having concavely curved annular walls. The impeller member is provided with vanes, or fangs, preferably, made in the form of ribs 27, said ribs or vanes being tallest adjacent the hub portion 26 and having a gradually tapering form, the side edges thereof being curved to conform to the curvature of the inner faces of the portions 11 of the casing and extending closely adjacent the inner faces of the casing, so as to just clear the same when the impeller is rotating within the casing.

It will be noted that the rib-like members 27 on said rotor extend outwardly in a non-radial direction, extending at a somewhat acute angle to the radius in a backward direction from the hub to the periphery of the disk, the direction of rotation of the rotor being indicated by the arrows in Fig. 2, the angularity of the ribs to the radial being slightly less than 45 degrees, although it is obvious that this can be varied as may be found desirable. Said rib-like members extend outwardly beyond the peripheral edge 28 of the disk-like partition, as shown at 29, so as to form breaker members or fangs extending transversely across the periphery of the disk-like member, and closely adjacent the casing 11, so as to just allow clearance between said portions 29 of said ribs and said casing, as will be obvious from Fig. 1.

It will be noted that said members 27 are arranged in staggered arrangement, that is, the members 27 on opposite sides of the partition 25 are staggered relative to each other. This provides twice as many rib-like members 29 on the periphery of the disk-like partition 25 than if such staggered arrangement were not provided. Furthermore the breaking, agitating and vaporizing effect of the rib-like members is greatly increased by this arrangement, as the tendency is for the material on one side of the disk-like member to be thrown across the periphery thereof toward the other side thereof at the peripheral portions of the whirls provided on opposite sides of the disk-like member, thus providing interengaging streams of the liquid or other material that is being whipped about by the impeller member to further break up and more finely divide the material so whipped about.

The apparatus described thus provides for dividing the material that is to be acted upon thereby into two portions, entering on opposite sides of the disk-like member where the two portions are whirled separately at a high speed to centrifugally throw the same outwardly against the walls of the chamber and across the periphery thereof into inter-engaging streams, and finally out through the discharge opening 24 in finely divided condition. If desired, a collecting vessel of any suitable character, such as diagrammatically shown in the drawing at 30, may be provided, in which the material discharged through the opening 24 may be collected, if desired.

In carrying out my improved process, the liquid that is to have the characteristics thereof changed, is fed into engagement with rotative impelling means to rotatively impel and set up a violent whirling or centrifugal whipping motion thereof to cause the same to be immediately rapidly rotated and thrown outwardly away from the center of rotation. The impelling means, to create the rotative movement of the liquid, is located within a confined space, or chamber, so that the liquid, when caused to rotate at a rapid rate of speed, is centrifugally thrown against the wall of said confining means, or chamber, to violently engage or bombard the same. The action of said centrifugal force produces the bombardment of the liquid against the walls of the chamber within which such rotative movement thereof takes place, such centrifugal action and bombardment cooperating to bring about the change in the characteristics of the liquid so treated.

If the liquid that is to be treated is a viscous liquid, the viscosity thereof will be reduced by such treatment thereof and, if sticky, the stickiness will be decreased, the color will be changed to one lighter than that previous to treatment and the bulk of the material will be increased, thus decreasing the specific gravity of the material. Furthermore, in the case of certain materials, such as certain forms of molasses and syrups, there appears to be a partial crystallization of the material that is so treated. This makes the material much easier to handle and to utilize in conjunction with other materials, as the difficulty in handling the same due to its extremely great viscosity, is thereby avoided and spraying thereof on other materials is greatly simplified and made much easier to carry out.

The treatment of liquids to change the characteristics thereof by such whirling or whipping motion in a circular path by rotative impelling thereof, is not, however, limited to heavy viscous liquids, such as molasses, or to materials that are sticky, such as molasses or syrupy liquids. Other liquids of high viscosity that are of a heavy character are made lighter and more fluid by the above described method of treating the same, by subjecting the same to a rapid rotative impelling in the nature of a rotative whipping action. Thus heavy oils are changed in their characteristics to become more fluid and lighter in color and the combustibility thereof is increased by such treatment.

Other liquids that do not have any unusual degree of viscosity, such as water, for example are also changed in their characteristics by such treatment. I have found that when hard water is centrifugally whirled and whipped about by being impelled in a rotative path in the manner above described, the hardness of the water will be reduced and the water will have the characteristics of soft water.

I have further found that such a rotative whipping action as is obtained by impelling liquids at a rapid rate rotatively, not only changes the characteristics of the liquid, but finely divides the same, if the rate of rotation is high enough, so that the material so whirled and whipped about and centrifugally thrown against the walls of a chamber, when discharged therefrom in a finely divided state, will more thoroughly impregnate any material upon which the same has been thrown thereby or sprayed thereon. Thus, for example, oils of the character usually used for oiling roadways do not tend to enter very deeply into the material of the roadway, even though applied hot in the manner in which this has been previously done, but tend to stand about on the roadway in pools and gradually soak into the roadway. By my improved means of changing the viscosity and other characteristics of the oil and finely dividing the same, I can apply an oil, of the same gravity as has been previously applied by heating, in an unheated condition and this oil will enter the roadway and impregnate the same so thoroughly that it will not stand in pools thereon, but will be absorbed into the roadway practically as rapidly as sprayed thereon by my improved method.

While any of the material that is to be treated may be heated, if desired, either before or after treatment, this heating is not necessary and has no particular effect on the change in characteristics thereof due to such rapid whipping or rotative impelling thereof in a chamber. In fact, in some cases the heating will reduce the effect of the rotative whipping or impelling of the material over that obtained if the material is not heated. It has been found that, in the case of any material that has a gummy, or fibrous, character that tends to cut down the fluidity thereof, the treatment thereof in the manner set forth above breaks down the fiber tissue and gum contained therein, lowering the viscosity and breaking up the material so that it will be more readily workable for any purpose for which it is to be used. That is true whether the material is to be sprayed or otherwise applied, or utilized by itself or in conjunction with other materials, as the finer division thereof and the breaking up of the fiber and gum therein makes it easier to apply the same to other materials, or mix the same with other materials, or utilize the same for any purpose, as a much smoother, more workable, material is obtained in that manner, this being true of syrupy materials, such as molasses, and of oily materials, such as the heavy thick oils resulting from the distillation of petroleum. Thus the color of the liquid can be changed from a darker to a lighter color, the stickiness thereof can be decreased and the specific gravity decreased, and crystallization, or partial crystallization of materials that can be crystallized, can be produced. In the case of the treatment of hard water, the exact character of the change that takes place, from a chemical standpoint, has not been capable of determination, but the water, after treatment, acts with soap as would soft water, while if a quantity of the original hard water is not subjected to such treatment and is utilized with the same soap or soap solution, it will have all the characteristics of the hard water, but after the treatment of another quantity of the same water by the impelling thereof within the chamber in a rotative path at a rapid rate of rotation to cause the centrifugal throwing thereof against the walls of the chamber to finely divide the same, this water with the same soap solution will act as does soft water, and thus, as far as all practical purposes are concerned, the water is softened by such treatment.

The rate of rotation of the impelling means to rotate the liquid in the chamber at the proper rate to get the desired breaking down and fine division of the same, depends upon the character of the liquid that is to be treated and the rate at which the material is fed into the chamber in which the whirling takes place. A light liquid at a certain rate of rotation and rate of feed will be so finely divided and entirely broken up as to be turned into a vapor. A heavy viscous liquid at the same rate of rotation and same rate of feed will be only so finely divided and broken up that it will be more fluid and will be in a somewhat atomized condition, but not reduced to a vapor. However, if the heavy viscous liquid is fed into the chamber at a slower rate or the rate of rotation of the impelling means is increased, the highly viscous liquid can also be vaporized. It has been found that the impelling action on the liquid must be at a rate of about 2000 revolutions per minute, or more, to get the desired breaking down and fine division of the material to change the characteristics thereof. Also the material must be fed into the apparatus at the proper rate and this rate must be such that there will be sufficient room in the chamber in which the material is rotatably impelled that the same can be whipped and violently thrown about therein, and bombarded by centrifugal force against the walls of the chamber. That is, there must not be a solid mass of the liquid in the chamber, nor even any approach at a solid mass, or complete filling of the chamber by the material. Also, to get the best results the chamber should closely conform to the path of the bladed impelling means, so that said impelling means passing closely adjacent the walls of the chamber breaks up and disintegrates the gum and fibre in certain viscous liquids by a sort of shearing action on said gum or fibre.

The material that has been treated can, of course, be discharged from the chamber while in an atomized or finely divided form, to spray, coat or impregnate some other material, or to apply the same to some surface. The finely divided condition of the material persists after discharge from the apparatus, and even after the material has been turned into an atomized or substantially vaporous state, it will, upon returning to a liquid state, have different physical characteristics than was previously the case, being generally of a more mobile character and having greater penetrating qualities than was previously the case, and being generally more workable than was previously the case. This is evidently due to the fact that the structure of the material has been broken down or changed in various respects. The material is not changed to the extent that it is not any longer a liquid, but is a liquid of different characteristics. Also, by the discharge thereof while under the influence of the centrifugal force that has been created by the violent rotative impelling or whipping of the same, the liquid will more deeply penetrate the material to which it is applied, if applied directly from the chamber in which the rotative action that creates the centrifugal force takes place, the centrifugal force created by the whirling or rotative whipping action thus being utilized to not only make the liquid more penetrative, but to physically force it into any surface to which the same is applied.

It has been found that, in all cases very desirable and satisfactory results are obtained by rotatively impelling the material that is to be finely divided, or vaporized, about a horizontal axis or substantially about a horizontal axis in the chamber, or chambers, used for that purpose.

It is not necessary that blades, projections or teeth be provided on the impelling means at the peripheral edge thereof, in order to break up and disintegrate the gum and fiber in certain materials that are to be treated. The particular shape of the surface of the rotor or impelling member is not important to the process. It is, however, desirable that the edge portion of the rotating member, or impelling member, conform closely to the wall of the chamber in which the same rotates. However, greater clearance can be provided between the rotor and impelling member to provide a spaced relation between certain portions of this impelling member and the chamber, if this is found desirable. The important thing in getting the disintegrating action is that the major portion of the impelling member have only sufficient clearance to prevent engagement of the rotor with the chamber walls, so that a very narrow passage is provided between the impelling member and the chamber in order to get the greatest amount of disintegrating or breaking up action on gummy or fibrous material.

Preferably, the apparatus is so arranged that the method is carried out to permanently change the characteristics of the liquid. This is accomplished by whirling or whipping the same about in a chamber, which has a substantially unrestricted discharge opening therein, this discharge opening also acting as means through which air is picked up by the impelling means and carried into the chamber in which the whirling action takes place. Also it is found desirable that the impelling means extend through the peripheral wall of the chamber, so as to enter the atmosphere, whereby more free entrance of air and free discharge of the liquids acted upon is obtained. Thus in order to obtain a permanent change of characteristics of most materials, it is desirable that the rotative impelling of the liquid that is to be altered or its characteristics changed, take place in a chamber that is open to the atmosphere from which the material acted upon is discharged freely without building up any appreciable pressure within the chamber and in which the rotative whirling action takes place in the presence of a considerable quantity of air.

Where no particular advantage exists in a permanent changing of the characteristics of the material, such whirling in a chamber, that is freely open to the atmosphere and from which the material is freely discharged without building up a pressure in the chamber in which the whirling takes place, is not necessary and the whirling or whipping action can take place in a chamber in which some compression may exist under certain conditions of feed and discharge and in which no large volume of air is present. Thus the discharge opening of the chamber may be connected with a conduit or a container into which the material that has been acted upon is discharged and collected. When such conditions exist, the permanent change in the characteristics of many materials will not be ordinarily accomplished, although under some circumstances, it may be.

In the case of many materials it is very desirable that the rate of rotation and the rate of feed, as well as the opening to the atmosphere of the chamber in which the whirling takes place, be such that the material that is being treated is vaporized, which vaporization can be accomplished by my improved method and with the apparatus herein referred to, by merely the rapid whirling or whipping thereof within a chamber closely conforming to the impelling means. When such vaporization takes place it has been found that most materials so vaporized are permanently changed in their characteristics. From tests made, it appears that in the case of some materials it is absolutely necessary that vaporization take place in order that the material have a permanent change in its characteristics.

What I claim is:

1. The method of changing the physical characteristics of a liquid, comprising dividing said liquid into a plurality of portions, separately introducing each of said portions into a defined space freely open to the atmosphere, rotatively impelling separately from one another the portions of said liquid at a rapid rate immediately upon introduction into said space to create a whirl of all the liquid in said space, bombarding walls with said liquid while under the influence of the centrifugal force of said whirl, creating streams of the liquid of said portions while under the influence of said centrifugal force and directing said streams into violent engagement with each other to finely divide said liquid.

2. The method of changing the color of a dark liquid to a lighter color, comprising dividing said liquid into a plurality of portions, separately introducing each of said portions into a confined space at a rate insufficient to fill said space, rotatively impelling separately from one another the portions of said liquid at a rapid rate in the presence of a large quantity of air immediately upon introduction into said space, to impart centrifugal force to all the liquid in said space, bombarding a wall with said material while under the influence of said centrifugal force, creating streams of the liquid of said portions while under the influence of said centrifugal force and directing said streams into violent engagement with each other to finely divide said liquid and create a mist-like vapor thereof, and discharging said material from said space while in a vaporous form while under the influence of said centrifugal force into a collecting vessel to return the same to a liquid state, whereby said liquid is made a lighter colr.

3. The method of decreasing the stickiness of a sticky, viscous, syrup-like liquid, comprising introducing said liquid continuously into a confined space, at a rate to incompletely fill said space, rotatively impelling the same in the presence of a large quantity of air immediately upon introduction into said space at a rate to violently whip the same about in said space with said air and impart centrifugal force to all the contents of said space to create a mist-like vapor thereof, and violently impinge said material against a wall, forcing the contents of said chamber while under said centrifugal force through restricted passages, directing portions of the contents of said space into violent engagement with each other while under the influence of said centrifugal force, and discharging said material in a vaporous form into a collecting vessel to return the same to a liquid state, whereby the stickiness thereof is decreased.

4. The method of applying a viscous liquid to an absorbent surface, comprising dividing said liquid into a plurality of portions, separately introducing each of said portions into a confined space, rotatively impelling separately from one another the portions of said liquid immediately after introduction into said space to impart centrifugal force to all the contents of said space and cause said liquid to violently engage walls of said space while subjecting the same to a disintegrating action, creating streams of the portions of said liquid, directing said streams into violent engagement with each other, and discharging said liquid centrifugally from said space in a mist-like form onto an absorbent surface while under the influence of said centrifugal force to drive said liquid forcibly into said surface.

5. The method of decreasing the specific gravity of a viscous liquid, comprising dividing said liquid into a plurality of portions, separately introducing each of said portions into a confined space at a rate insufficient to fill said space, rotatively impelling separately from one another the portions of said liquid at a rapid rate in the presence of a large quantity of air immediately upon introduction into said space, to impart centrifugal force to all the liquid in said space, bombarding a wall with said material while under the influence of said centrifugal force, creating streams of the liquid of said portions while under the influence of said centrifugal force and directing said streams into violent engagement with each other to finely divide said liquid and create a mist-like vapor thereof, and discharging said material from said space while in a vaporous form while under the influence of said centrifugal force into a collecting vessel to return the same to a liquid state in an expanded condition.

6. The method of permanently changing the physical characteristics of a liquid, comprising dividing said liquid into a plurality of portions, separately introducing each of said portions into a defined space freely open to the atmosphere, rotatively impelling separately from one another the portions of said liquid at a rapid rate immediately upon introduction into said space to create a whirl of all the liquid in said space, bombarding walls with said liquid while under the influence of the centrifugal force of said whirl, creating streams of the liquid of said portions while under the influence of said centrifugal force and directing said streams into violent engagement with each other to vaporize said liquid, and discharging said vaporized liquid into a collecting vessel to return the same to a liquid state.

7. The method of decreasing the viscosity of a viscous liquid material containing gum and fibre, comprising dividing said liquid into a plurality of portions, separately introducing each of said portions into a confined space open to the atmosphere at such a rate and in such quantity as to occupy only a part of said space, rapidly impelling separately from one another the portions of said material rotatively immediately upon introduction into said space and continuously while in said space to create a violent centrifugal whirl of said material and air and subject all of said material and air to centrifugal force, subjecting said material repeatedly to a shearing action while under the influence of said centrifugal force by forcing the same through restricted spaces to break up the gum and fibre therein, creating streams of the material of said portions while under the influence of said centrifugal force and directing said streams into violent engagement with each other to finely divide said material and discharging said material unrestrictedly from said space directly from the periphery of said whirl into the atmosphere, whereby the viscosity of said material is reduced.

8. The method of decreasing the stickiness and viscosity of a sticky, viscous, syrup-like material comprising partly crystallizing and aerating said material by dividing said material into a plurality of portions, separately introducing each of said portions into a confined space and rotatively whipping said portions separately from one another in said space at a rate sufficient to produce a mist-like vapor thereof in the presence of an unrestricted supply of air and at substantially atmospheric pressure, creating streams of said material of said portions while under the influence of said centrifugal force and directing said streams into violent engagement with each other to finely divide said material, and unrestrictedly discharging the aerated partly crystallized mist into the atmosphere while under the influence of the centrifugal force of said whipping action.

9. The method of applying a viscous gummy fluid material to a surface, comprising dividing said material into a plurality of portions, separately introducing each of said portions into a defined space freely open to the atmosphere at such a rate and in such quantity as to only occupy a part of said space, rapidly impelling separately from one another the portions of said material rotatively immediately upon introduction into said space and continuously while in said space to create a violent centrifugal whirl of said material and air and subject all of said material and air to centrifugal force, subjecting said material repeatedly to a shearing action while under the influence of said centrifugal force by forcing the same through restricted spaces to break up the gum therein, creating streams of the portions of said material, directing said streams into violent engagement with each other, and discharging said material unrestrictedly from said space directly from the periphery of said whirls in a vaporous condition upon the surface to be impregnated therewith.

10. The method of permanently changing the physical characteristics of a liquid comprising dividing said liquid into a plurality of portions, separately introducing each of said portions into a defined space freely open to the atmosphere, rotatively impelling separately from one another the portions of said liquid at a rapid rate immediately upon introduction into said space to create a whirl of all the liquid in said space, bombarding walls with said liquid and subjecting said liquid to a shearing action while under the influence of the centrifugal force of said whirl, creating streams of the liquid of said portions while under the influence of said centrifugal force and directing said streams into violent engagement with each other to finely divide said liquid.

HERMANN H. SCHMIDT.